Oct. 29, 1957 A. E. LEPLEY 2,811,651
ALTERNATOR CONTROL SYSTEM
Filed June 29, 1954 3 Sheets-Sheet 1
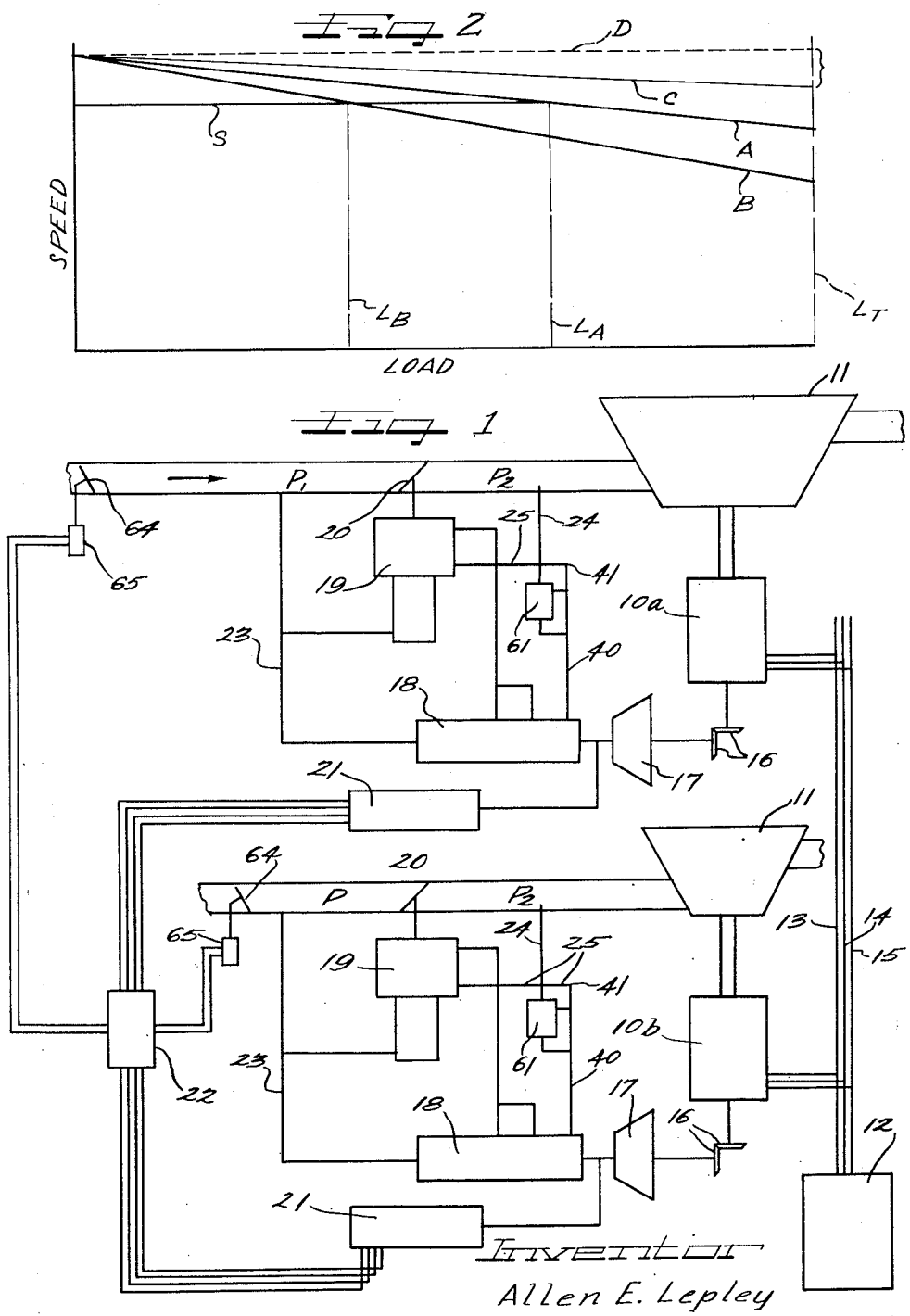
Inventor
Allen E. Lepley

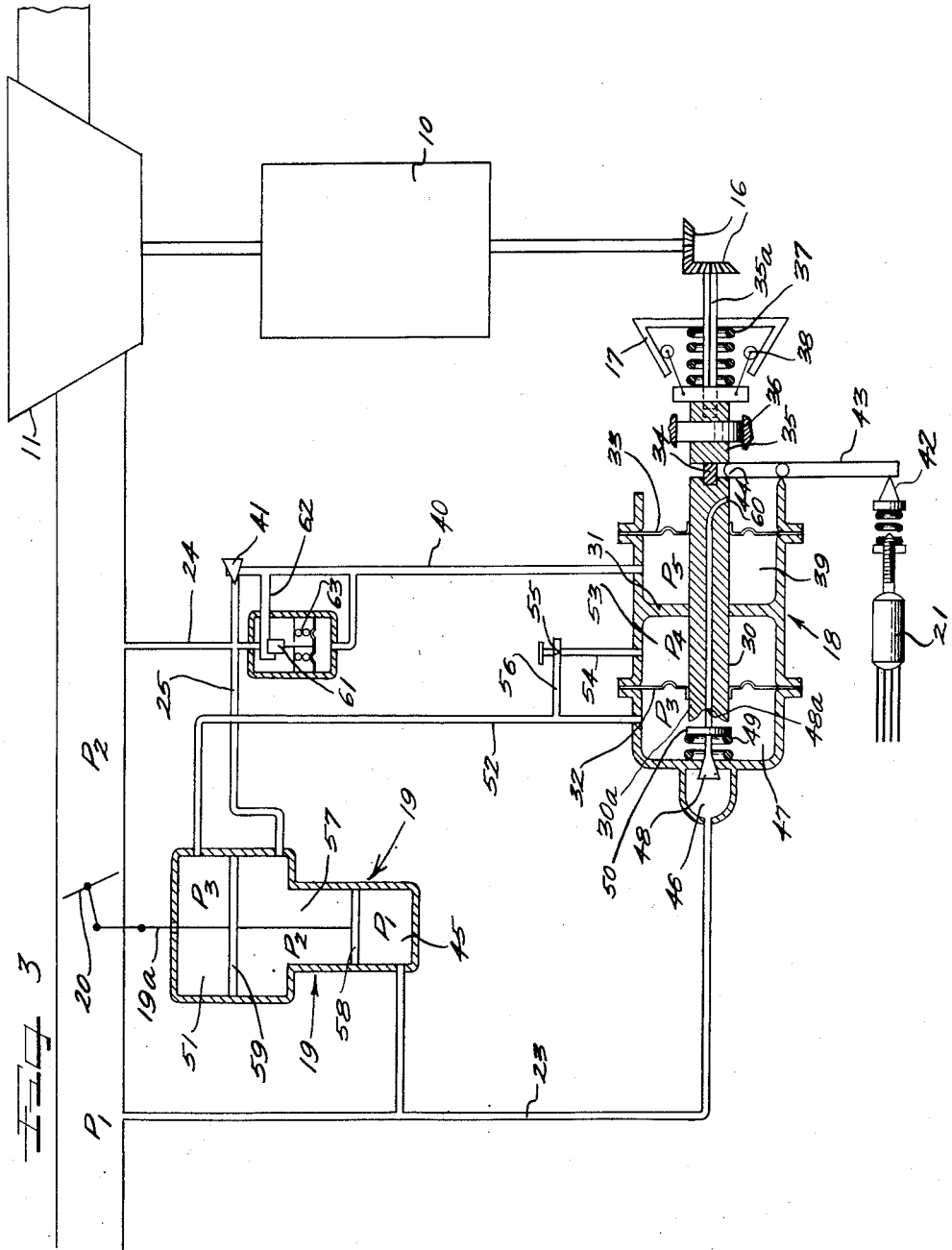

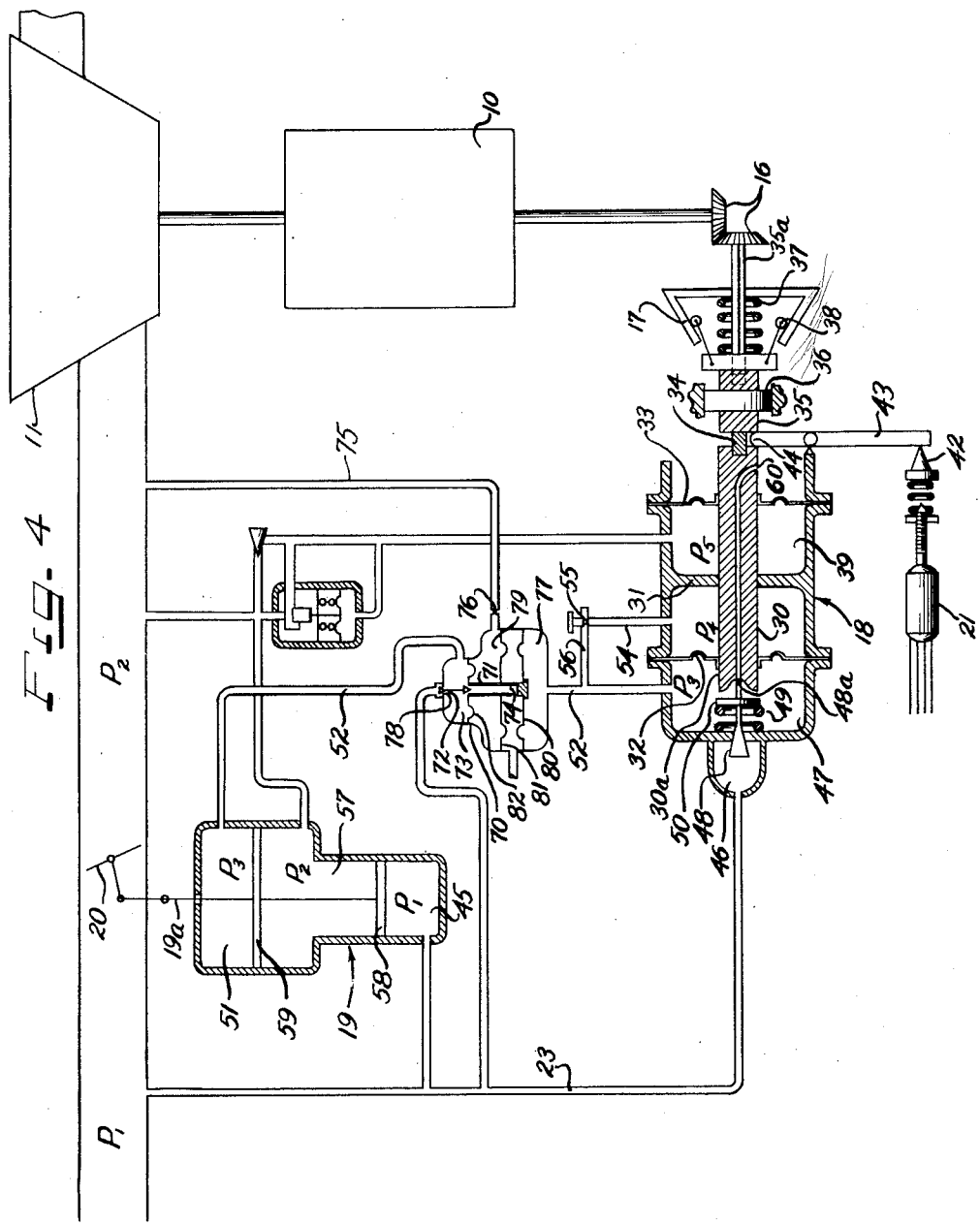

United States Patent Office 2,811,651
Patented Oct. 29, 1957

2,811,651
ALTERNATOR CONTROL SYSTEM

Allen E. Lepley, Wickliffe, Ohio, assignor to Thompson Products Inc., Cleveland, Ohio, a corporation of Ohio Application June 29, 1954, Serial No. 439,966

13 Claims. (Cl. 290—4)

The present invention relates to control systems for use with turbine driven alternators. More particularly, the invention relates to a novel combined torque and speed responsive system for controlling the throttle of a gas turbine which in turn provides the power for driving an alternator forming a part of a multiple alternator power supply system.

With the advent of larger and more complex aircraft with their larger control surfaces and multitudinous electrically powered controls the need for large quantities of electrical energy on aircraft has greatly increased. Since, small weight and size are at a premium on aircraft, and likewise, since efficiency is also at a premium, it has been considered most practicable to utilize a plurality of alternators for supplying the electrical system of large modern aircraft. These alternators are preferably located adjacent the separate jet engines of the aircraft and are driven by means of air turbines operating on compressed air bled from the compressors of the aircrafts' jet engines by conventional means.

The use of a plurality of alternators has, however, posed several serious problems of control. As is well known, alternators connected in parallel relationship with each other will tend automatically to remain locked in synchronism with each other once they are synchronized thereby causing them to rotate at substantially identical speeds.

However, this synchronism, while it will tend to cause all of the alternators to operate at the same speed, will not require that individual alternators carry their own proportionate share of the electrical load. Thus, in situations where the speed versus load droop characteristics of the alternators are different, one of the alternators will assume more than its share of the load and it may, in some instances, assume the electrical load to an extent wherein it operates as a generator driving the remaining alternators as synchronous motors. When the latter occurs, the alternator which has accepted the load will, of course, become greatly overloaded and if the condition continues it will ordinarily become overheated and burn out.

It has therefore been found necessary to construct a control system capable of governing the speed of the individual alternators while simultaneously governing the torque output of the individual alternators, whereby each alternator will have a predetermined constant droop characteristic and the load on the individual alternator will be maintained substantially at its proportionate share.

The control system of the present invention is based upon the use of the turbine pressure, taken downstream of the turbine throttle, as a substantially accurate indicator of the torque being assumed by the individual alternator driven by the turbine. Tests have shown that in operation a torque, or load, versus turbine inlet pressure curve will be substantially a straight line intersecting the pressure coordinate at a point adjacent the point of origin. The difference between the point of intersection and the point of origin is made up by the constant losses of the system and, hence, it may be said that the pressure bears a direct relationship to the load, the relationship being $P = \text{load} + \text{constant}$. The variable turbine pressure, may then be utilized in combination with a speed responsive turbine inlet pressure control valve to modify the operation of the speed responsive valve in accordance with loading on the turbine to provide an accurately scheduled droop in the speed versus load characteristic.

By adding the positive pressure of the turbine to the force generated by the centrifugal flyweights of the speed responsive governor, in opposition to a constant spring force, the present control system is capable of controlling the throttle of the turbine to maintain a predetermined scheduled speed versus load droop that may readily be adjusted to provide substantially identical droop characteristics for all of the individual alternators and hence cause the alternators to divide the total load substantially equally.

It is, therefore, an object of the present invention to provide a simplified automatic load division and speed control for alternators.

Another object of the present invention is to provide a novel load division control for alternators and which utilizes the inlet pressure of the individual drive turbine as a load sensitive variable.

Yet a further object of the present invention is to provide a novel alternator control system incorporating a load division control in combination with speed control.

Yet another object of the present invention is to provide a mechanical-pneumatic gas turbine control capable of providing a substantially linear speed versus load "droop" characteristic.

Still a further object of the present invention is to provide a pneumatic control for the throttle of a gas driven turbine, which control will provide actuation of the throttle in response to a combination of forces representing the speed of the turbine and the load carried thereby.

A feature of the present invention is a control valve having a pneumatic actuator thereon operable in response to an increase in turbine operating pressure to move the valve in the same direction as caused by an increase in turbine speed as sensed by a flyball governor mechanically attached to the valve.

Another feature of the invention is the provison of a starting bypass arrangement for a pneumatic speed versus load droop control whereby initial operation and synchronization of the device may efficiently be provided.

Another feature of the present invention is the provision of a turbine speed and load control for use in combination with a plurality of similar turbines for driving similar alternators wherein each of the turbines may be controlled in accordance with the average load imposed upon the entire group of turbines.

Another object of the present invention is to provide a control having extremely rapid response to fluctuations in turbine throttle inlet pressures to apply a correcting, opposing, influence on the turbine inlet pressure while simultaneously providing an average increasing resistance to movement of the control valve in the turbine inlet pressure-increasing direction in accordance with the load imposed on the turbine, whereby a slight decrease in speed will occur upon a gradual increase in load irrespective of intermittent fluctuations in turbine inlet pressure.

Still other and further objects and features of the present invention will at once become apparent to those skilled in the art from a consideration of the attached drawings in which a preferred embodiment of the present invention is shown by way of illustration only.

On the drawings:

Figure 1 is a diagrammatic view of a turbine driven alternator system incorporating controls of the type contemplated by the present invention;

Figure 2 is a graphic presentation of the desired control characteristics of the present system;

Figure 3 is a diagrammatic view of a single control structure with the control valve parts enlarged to show their operation more clearly; and Figure 4 is a diagrammatic view of a modified form of the invention.

As shown on the drawings:

While the control system of the present invention may, of course, be utilized with various types of loads, it is contemplated that the system be utilized in connection with turbine driven alternators 10a, 10b. In modern aircraft installations, it is becoming more and more necessary, as noted above, that large amounts of electrical energy be provided. This is preferably accomplished through the use of a number of separately driven alternators of a relative small size capable of efficient partial load operation as well as superior full load operation. As may be seen from Figure 1, it is contemplated, therefore, that alternators 10a, 10b be driven by air turbines 11 and supply electricity to the load 12 by means of conventional 3-wire conductors 13, 14, 15.

As is well known, there is a strong tendency for the alternators 10a, 10b to run in synchronism with each other. This synchronism will cause the alternators to run at substantially identical speeds but will not require equal distribution of the load between the alternators. Thus, without satisfactory control for each of the alternators 10 to provide the alternators with similar speed versus load characteristics, one or the other of them will asssume a disproportionate percentage of the load and, in fact, in some cases an unbalanced situation may result in which one of the alternators actually drives the others as motors thereby becoming greatly overloaded.

An understanding of this phenomenon may be obtained from the graph of Figure 2. If it were assumed that the two alternators had somewhat different inherent load-versus-speed droop characteristics, as is common, the operational curve of alternator 10a could be shown as line A and that of alternator 10b as B. If the total load were $L_T$, then the alternators 10a and 10b would operate at a speed which would give total load equal to $L_T$. This point of operation would be approximately indicated by the speed line S and the load assumed by the individual alternators would be $L_A$ and $L_B$ respectively, the sum of the two being equal to $L_T$.

It will be readily apparent that, with the characteristics shown, turbine 10a will carry much more than its share of the load, and turbine 10b much less than its share. Thus, it is desired that all of the turbines have the same speed-versus-load characteristic so that the individual turbines will operate at the same load as well as at the same speed. By the present invention, the individual alternators are all caused to operate on a predetermined curve C, thus insuring equal load division.

In actual practice it has been found that a scheduled five percent droop in operating speed from the no-load speed to the full load condition is satisfactory for control purposes. Thus, with no-load, the alternators will operate at the rated speed and as the load increases, the speed of the alternator is controlled so that it gradually drops off in direct proportion to the increase in load, along a five percent decline as shown by the line C of Figure 2.

While the scheduled-droop type of control is a relative simple technique from the point of view of theoretical simplicity, nevertheless relatively severe problems arise in the field when the source of energy for the various alternators is air, gas or other similar fluid medium and the source of that medium is somewhat erratic. In aircraft installations it is desired that air be taken from the jet engine air compressors, or in some cases from the slip stream, for operation of such auxiliaries as alternators. These sources of air are subject to fluctuation, and hence energy fluctuations in the drive for the various alternators provide a serious problem.

In order to provide the necessary straight line droop characteristic so that the control of the system may be substantially accurate and predictable, it is essential that the individual alternators be controlled to provide a substantially constant and predictable operation irrespective of fluctuations in the energy source. This is provided in the present invention through the use of a novel control valve which is subject to external regulation in response to load changes on the individual alternator, load changes on the alternator system, increases and decreases in the turbine inlet pressure driving the alternator, and changes in speed of the alternator.

Schematically, the arrangement is shown in Figure 1 wherein the turbines 11 drive the alternators 10a, 10b which in turn drive the speed responsive mechanisms 17 through gearing 16, actuating the control valves 18. The control valves 18 actuate the throttle actuators 19 to control the position of the throttles 20. The valves 18 are also controlled by the load trim servomotors 21 operated by a servo generator or other control apparatus mounted in the control box 22. The pressure $P_1$ upstream of the throttle valves 20 is passed through the conduits 23 to the control valves 18 and to the actuators 19, and the pressure $P_2$ downstream of the throttle valves 20 is likewise directed to the valves 18 by means of conduits 24 and to the actuators 19 by means of the conduits 25.

Details of the operation of the control valves 18 may be seen from a consideration of Figure 3 wherein the components thereof are diagrammatically shown. There, the control valve 18 is shown to comprise a reciprocating core 30 slidably mounted within the wall 31 and provided with a pair of diaphragms 32 and 33. At the right hand end of the core 30, as viewed in Figure 3, a support is provided in the form of a cylindrical extension 34 on the rotatable shaft 35 which is in turn supported for rotation relative to a fixed housing (not shown) by the bearing 36. The shaft 35 is thus rotatably mounted relative to the core 30 and causes movement of the latter only in the reciprocatory sense.

A polygonal shaft 35a is coupled for rotation with the alternator 10 by gearing 16 shown in Figure 1 and is connected to rotate the centrifugal weight carrying conical casing 17 as well as the weights 38 through its non-circular cross section. The casing 17 carries within it a governor spring 37 which ordinarily maintains the shaft 35a in its furthermost lefthand position and the flyweights 38 near the shaft 35. Increased speed of rotation of the casing 17 and the weights 38 will, of course, cause outward movement of the weights with a compression of the spring 37, and hence, a righthand movement of the shaft 35.

Movement of the shaft 35 in the righthand direction causes movement of the core 30 in the righthand direction, preferably through a positive mechanical connection between the core 30 and the extension 34. However, since movement of the core 30 in the righthand direction is positively urged by the pressure in chambers 39 and 47 and thus, it is in some cases not essential that a two-way connection be provided at 34. Instead, a connection whereby only force transmitted in the left hand direction by the shaft 35 may be used if desired.

It is intended that the speed responsive device 17 be substantially conventional, in that it will actuate the valve core 30 into a throttle opening condition upon the reduction in speed below a desired point, and will cause a movement of the valve core to the right, tending to cause a closure of the throttle plate 20 upon an increase in the speed of rotation of the alternator above that desired. Thus, in the ordinary circumstance wherein no other controls are provided, the governor 17 would operate to provide a substantially constant speed of rotation of the turbine 11 and hence the alternator 10. Such an operating condition would be that shown by the dotted line D, Figure 2.

In the present invention, however, it is contemplated that the turbine and hence the alternators be driven at a slightly decreasing speed with increasing load. In order to depress the speed of rotation upon the increase in load on the system, means are provided for adding a force proportional to the load on the turbine 11, and hence the alternator 10, to the force applied by the flyweights 38. This means comprises a pressure tap 24 from the downstream side of the throttle 20.

The pressure $P_2$, in the conduit 24, as noted above has been found through tests to reflect the load on the turbine 11. Thus, although slight fluctuations occur in the pressure $P_2$ as a result of variations in the line pressure $P_1$ and instantaneously applied electrical loads, the general variations in $P_2$ occur as a result of variations in the load on the turbine 11 as required to maintain the turbine at the desired operating speed. Thus, as the load increases, the pressure $P_2$ increases in a direct relationship therewith.

This direct relationship is utilized through the provision of scheduled droop chamber 39 in the valve 18. The chamber 39 is connected to the conduit 24 by means of a conduit 40 and droop delay bleed 41. By providing the adjustable needle valve 41 in the conduit 40, fluctuations in the pressure $P_2$ are smoothed out and the response of $P_5$ is delayed relative to changes in speed of gear 16 resulting from large changes in load. This delay is desirable to minimize hunting of the apparatus. The pressure $P_5$ which, as noted above, increases with the load on the turbine, urges the valve core 30 toward the right in the same manner caused by an increase in speed of the centrifugal mechanism 17. Thus, it will be observed that as the load increases, and hence the pressure $P_2$ increases, the force applied against the core 30 by the diaphragm 33 will increase causing the valve core 30 to move toward the right at a lower speed than would have taken place were there no force applied thereto other than that of the centrifugal mechanism 17. Thus, as the load increases a droop is applied to the alternator causing it to operate at a speed progressively slower.

An adjustment is achieved between the force applied in the chamber 39 and the centrifugal mechanism 17, to change the position of line C, by the load trim servomotor 21. As may be seen, this motor actuates an adjustable spring fulcrum 42 which in turn urges a lever 43 acting against the core 30 at 44.

By this adjustment the droop characteristic may be controlled. Thus, by increasing the tension on the spring fulcrum 42, the pressure $P_5$ in chamber 39 will not balance the force of spring 37 at as low a value of $P_5$ and hence the intercept of the line C, Figure 2, will be increased. Likewise, upon a decrease in the tension of spring 42, the intercept of line C would be decreased. Since the intersection of line S on line C will determine the load carried by each individual alternator, each alternator may be initially adjusted to operate on the same curve as the remaining alternators, thus automatically requiring it to take its share of the load. Of course, if it should be desired for any reason to have an alternator assume more or less than its share of the load, the load trim servo adjustment will permit modification of the portion of line C to cause such a load shift.

Actuation of the throttle plate 20 is accomplished through the balancing of hydraulic pressures $P_1$, $P_2$ and $P_3$ within the hydraulic motor 19. As may be seen from Figure 3, pressure in the conduit 23 is applied to the chamber 45 directly. Likewise, the pressure $P_1$ is applied to the chamber 46 in the control valve 18 and is introduced into the chamber 47 through a one-way check valve 48 biased in the lefthand, closed position by means of a spring 49 and abutment washer 50. The chamber 47 is connected to chamber 51 by means of connecting conduit 52 and is likewise connected to an integration chamber 53 by means of connecting conduit 54 and an integration rate bleed 55 leading to an intermediate conduit 56. Pressure $P_2$ is applied to the chamber 57 of the fluid motor 19 through the conduits 24 and 25 and operates to urge the actuating rod 19a upwardly into the throttle closed position as a result of the differential in area between the pistons 58 and 59.

It will be apparent that the valve core 30 will necessarily assume a balanced condition with its end 30a in contact with the end 48a of the check valve 48. This is true since movement of the valve core 30 toward the right will permit venting of the chamber 47 to atmosphere through the vent 60 and hence, the fluid pressure within the chamber 51 of the actuator 19 will be vented to atmosphere and the pressure in chambers 57 and 45 will combine to close the throttle completely. On the other hand, movement of the core 30 to the left sufficient to unseat the valve 48 will cause an introduction of the pressure approaching the value of $P_1$ to the chamber 51 and in view of the fact that the pressure $P_1$ is greater than the pressure $P_2$ in ordinary usage, the differential in areas between the pistons 58 and 59 will cause the actuating rod 19a to move downwardly and the throttle plate 20 to open. In order that an established condition be reached, it is therefore apparent that the valve core 30 must be positioned immediately adjacent the end 48a of the check valve 48 in a balanced condition to maintain balancing pressure $P_3$, between pressures $P_1$ and $P_2$, in chamber 51.

In the balanced condition of the control valve 18, the pressures $P_3$ and $P_4$ in the chambers 47 and 53 respectively will be substantially identical since the integration rate bleed 55 will have permitted equalization of the pressures therein over a period of time. Thus, the only forces tending gradually to modify the position of the valve core 30 will be the forces applied by the diaphragm 33 in response to changes in pressure $P_2$ and forces applied by the centrifugal apparatus 17.

For the purpose of understanding the operation of the control system we will assume that the load trim servomotor 21 applies a substantially constant adjusted force to the valve core 30. This force when combined with $P_5$ operates to provide a speed versus load curve C having a scheduled droop similar to the other alternators so that the alternator will assume its fair share of the load.

Should the pressure $P_2$ increase indicating an increase in load, the pressure $P_5$ will likewise increase and a force will be applied tending to urge the valve core 30 to the right overpowering slightly the force applied by the load trim servomotor. This will cause a venting of the chamber 47 to atmosphere, a decrease in pressure in the chamber 51, and hence will cause closure of the throttle 20 at a speed less than that previously necessary to cause the valve core to actuate the throttle.

In the alternative, should the pressure $P_2$ drop off, indicating a decrease in the load, the pressure $P_5$ in the chamber 39 will decrease and the spring 37 will cause the normally balanced core 30 to move toward the left. This movement will cause a venting of the chamber 47 to the chamber 46, and hence cause an increase in pressure $P_3$ of the chamber 51, thereby causing the alternator to operate at a higher speed at the decreased load. In effect, therefore, the alternator is merely moved to a different load point on the scheduled droop line C.

The valve core 30 is maintained in its substantially stabilized position through the integration chamber 53 which prevents rapid movements of the valve core 30. This is accomplished through the provision of an integration rate bleed 55 which prevents the rapid passage of air under pressure to or from the chamber 53 to the chamber 47. Thus, should the valve core 30 attempt to move rapidly toward the right completely venting the chamber 51, hence causing a fast fluctuation in the throttle position, the righthand movement will be opposed by the pressure in the chamber 53, which will be slightly greater than the pressure in the chamber 47 for a short period of time.

In view of this force tending to cause the valve core 30 to position itself against the valve 48, it will be apparent that the pressure P₃ in chamber 47 is ordinarily somewhat less than P₁ and slightly greater than P₂, thereby positioning the throttle valve 20 in a constant, unchanging position, determined by the pressures and by the areas of pistons 58 and 59, until such time as the pressure P₁ or P₂ are modified.

In view of the fact that the actuator 19 is operated by pressures developed in the lines to the turbine, it will be apparent that slight fluctuations in line pressure will be manifested in the fluid motor 19. These fluctuations are minimized in their effect on the actuator rod 19a through the provision of a differential type fluid motor, but slight fluctuations in the valve actuator 19a will of course occur. It will be apparent, however, that these fluctuations will act on the throttle in a manner such as to cause a reversal of the fluctuation. Thus, for example, should the pressure P₁ increase suddenly, the pressure in chamber 45 would increase suddenly without a corresponding rapid increase in the chamber 51, and hence the valve 20 would close somewhat preventing the transmission of the higher pressure to the turbine in the form of increased P₂. Likewise, should the pressure P₁ decrease suddenly, the pressure in the chamber 45 would decrease and the pressure in the chamber 51 would cause a downward movement of the actuating shaft 19a thereby opening the throttle valve 20 preventing the reduction in pressure P₁ from causing a similar reduction in the pressure P₂.

As stated above, the rapid fluctuations in the pressure P₂ resulting from a sudden increase in load on the alternator 10 are prevented from causing rapid fluctuations in the valve core 30 by means of the droop delay bleed 41. This bleed delays the change in P₅ and also smooths out pulsations to transmit a delayed average increasing or decreasing value to the scheduled droop chamber 39, where the increasing or decreasing load, whichever occurs, will cause a modification of the speed setting at which the turbine and alternator will run, and at which the control valve will be actuated if the pressure P₂ makes more than a mere instantaneous change.

In the initial starting of the system, there will, of course, be no pressure in the conduit 40 and the application of pressure to the chamber 39 will not be immediate in view of the droop delay bleed 41. Thus, in order to obtain movement of the valve core 30 toward the right to prevent an excessive speed build up upon initial starting, the bypass 61 is provided.

The bypass 61 opens a connecting conduit 62 to the conduit 24 whenever the pressure in the conduit 40 is insufficiently great to overcome the pressure of the spring 63 urging the valve 61 into the closed position. As soon as the load has been assumed by the turbine 21 to the extent that P₂ has reached a value within the ordinary operating range of the apparatus, the pressure in the conduit 40 will have assumed a value sufficient to cause the valve 61 to close, and hence forth variations in pressure will be transmitted only through the droop delay bleed 41.

Manual valves 64 are provided in each of the turbine inlet pressure lines for the selective deenergization of the separate alternators when desired. Thus, in the case of damage to one or more of the alternators of the system, the damaged unit may be withdrawn from operation by shutting off the supply to its turbine 11. This manual means may take any conventional form, such as electrical solenoids 65 actuated by levers at the control 22, and may, if desired, be additionally power operated by means of an electrical hydraulic safety system in response to failure, either physical or electrical, of an alternator.

In Figure 4 of the drawings, a modified embodiment of the invention is shown in diagrammatic form. It has been found in actual practice that in cases where the physical dimensions of the valve 20 are large and a large actuator is required, a volume booster is very desirable to overcome the time lag that ordinarily would occur in the actuation of the valve.

As may be seen from Figure 4, a volume booster generally indicated at 70 is inserted in the conduit 52 connecting the chambers 47 and 51. This volume booster utilizes the pressure P₃ from the chamber 47 to control the flow of fluid to the chamber 51 from the main inlet line P₁ in proportion to the pressure P₃. This is accomplished by movement of the booster core 71 into and out of contact with the check valve 72 controlling flow from the chamber 73 through the relief bore 74 to atmosphere. Balancing control is provided by the application of pressure P₂ by means of the conduit 75 having a delayed bleed 76 therein.

In operation, the system shown in Figure 4 is substantially the same as that shown in Figure 3 except that the valve 20 is rapidly actuated in response to changes in the pressure P₃ found in chamber 47. Thus, as the pressure in chamber 47 increases, the pressure in chamber 77 increases, tending to move the core 71 upwardly, closing the bore 74 an opening the valve 78 to cause fluid to flow from the conduit 23 to chamber 51. This flow will continue until the pressure downstream of the valve 20 has changed sufficiently to cause the pressure in chamber 79 to balance the pressure in chamber 77, causing the valve 78 to be closed.

As will be appreciated, the steady state condition of the volume booster is that in which P₂ equals P₃ entering from chamber 47. As a result of the constriction 76 and the differential in size between the valve core controlling diaphragms 80, 81 and 82, the pressure in chamber 51 is caused to react in an accentutaed manner relative to changes in the chamber 47 to thereby provide substantially immediate response at the throttle 20.

It will thus be apparent that we have provided a novel alternator control system wherein an adjustable, scheduled, substantially straight line droop characteristic is provided in response to increased load on the alternator and wherein the load on the entire system will be effectively averaged on the individual alternator units. Through the combination of speed control and load control with associated damping controls the alternators of the present system are prevented from assuming unequal load division even though their speeds are substantially constant.

While variations and modifications may of course be made in the structure above disclosed and described, without departing from the scope of the novel concepts of the present invention, it is understood that the application is to be limited only by the scope of the appended claims.

I claim as my invention:

1. An alternator control system comprising a plurality of alternators supplying a common electrical load, a gas driven means for supplying power to each of said alternators, a throttle for each gas driven means for increasing the operating pressure to, and hence the torque, of each gas driven means, an actuator for each throttle, and a control for each said throttle actuator, said control having first means resiliently urging it into throttle opening direction, second means urging it in throttle closing direction upon an increase in alternator speed, third means urging it in throttle closing direction upon an increase in turbine inlet pressure, and fourth means for adjusting the balance between said first and third means.

2. An alternator control system comprising a plurality of alternators connected in parallel to a common electrical load, a gas driven means for supplying motive power to each of said alternators, a throttle for each gas driven means for varying the energy input to each of said gas driven means, a control for each of said throttles, said control having means resiliently urging it into throttle opening direction, means maintaining it in a predetermined position corresponding to a predetermined speed of said alternator, and means urging it in the throttle closing direction upon an increase in load carried by the individual alternator associated therewith, said last named means comprising a pneumatic piston urging said control in the throttle closing direction an amount proportional to the pressure at the inlet of said gas driven means.

3. An alternator control system comprising a plurality of alternators connected in parallel to a common electrical load, a compressed gas driven means for supplying motive power to each of said alternators, a throttle for each gas driven means for varying the energy input to each of said gas driven means, an actuator for each said throttle, and a control for each of said actuators, said control having means resiliently urging it into throttle opening direction, means maintaining it in a predetermined position corresponding to a predetermined speed of said alternator, and means urging it in the throttle closing direction upon an increase in load carried by the individual alternator associated therewith, said last named means comprising a pneumatic piston urging said control in the throttle closing direction an amount proportional to the pressure at said gas driven means and including delay means associated with said pneumatic piston whereby the effect of rapid fluctuations in the said pressure to said gas driven means will not be instantaneously reflected in force applied to said piston.

4. In combination with a turbine and an alternator driven thereby, a control comprising a throttle for said turbine, a fluid motor for actuating said throttle, said fluid motor comprising a pair of pistons secured to a reciprocal shaft mounted in an enclosed housing, and forming a first chamber of small area at one end of said piston rod, a second larger chamber at the opposite end of said piston rod and a third chamber between said pistons having a large area adjacent said second chamber and a small area adjacent said first chamber, means applying gas pressure upstream of said throttle to said first chamber, means for applying gas pressure downstream of said throttle to said third chamber and control means for varying the pressure in said second chamber to control the position of said throttle, said control means comprising a reciprocable control valve positioned within a housing and a wall surrounding said reciprocable valve providing a pair of chambers, a diaphragm secured to said valve and to said housing on one side of said wall and a second diaphragm secured to said valve and to said housing on the other side of said wall, a closure for said housing at the end thereof adjacent said first diaphragm whereby a chamber is provided between said first diaphragm and said closure, a check valve in said closure wall positioned for contact by the end of said valve for opening of said check valve upon movement of said valve against the end thereof, a source of hydraulic pressure associated with said check valve and introduceable into said chamber between said first diaphragm and said closure upon the movement of said control valve to the left, a conduit connected with said last named chamber and to said second chamber, a second conduit connecting said third chamber to said chamber formed by said wall and said second diaphragm, and means responsive to the speed of said alternator for urging said valve to the left into check valve opening position upon a decrease in speed of said alternator below a predetermined selected value.

5. In combination with a turbine and an alternator driven thereby, a scheduled droop control comprising a throttle for said turbine, a throttle actuator, and means for controlling said actuator, said means comprising a valve supplying a control pressure to said actuator, said valve including first alternator-speed responsive means urging it to cause throttle closing upon an increase in alternator speed above a predetermined speed, second means urging it to cause throttle closing on an increase in turbine inlet pressure, and third means selectively insertable in opposition to said first and second means to adjust the relationship between said first and second means.

6. In combination with a turbine and an alternator driven thereby, a scheduled droop control comprising a throttle for said turbine, a throttle actuator, and means for controlling said actuator, said means comprising a valve supplying a control pressure to said actuator, said valve including first alternator-speed responsive means urging it to cause throttle closing upon an increase in alternator speed above a predetermined speed, and second means urging it to cause throttle closing on an increase in turbine inlet pressure, said second means including a damping orifice for preventing rapid fluctuations in said inlet pressure from affecting said valve.

7. In combination with a turbine and an alternator driven thereby, a scheduled droop control comprising a throttle for said turbine, a throttle actuator, and means for controlling said actuator, said means comprising a valve supplying a control pressure to said actuator, said valve including first alternator-speed responsive means urging it to cause throttle closing upon an increase in alternator speed above a predetermined speed, and second means urging it to cause throttle closing on an increase in turbine inlet pressure, said second means including a delay means for preventing rapid fluctuations in turbine inlet pressure from causing movement of said valve and further including a bypass for said delay means automatically bypassing said delay means at turbine inlet pressures below a predetermined value.

8. In combination with a turbine and an alternator driven thereby, a scheruled droop control comprising a throttle for said turbine, a throttle actuator, and means for controlling said actuator, said means comprising a valve supplying a control pressure to said actuator, said valve including first alternator-speed responsive means urging it to cause throttle closing upon an increase in alternator speed above a predetermined speed, second means urging it to cause throttle closing on an increase in turbine inlet pressure, and third means selectively insertable in opposition to said first and second means to adjust the relationship between said first and second means, said second means including a damping orifice for preventing rapid fluctuations in said inlet pressure from affecting said valve.

9. In combination with a turbine and an alternator driven thereby, a scheduled droop control comprising a throttle for said turbine, a throttle actuator, and means for controlling said actuator, said means comprising a valve supplying a control pressure to said actuator, said valve including first alternator-speed responsive means urging it to cause throttle closing upon an increase in alternator speed above a predetermined speed, second means urging it to cause throttle closing on an increase in turbine inlet pressure, and third means selectively insertable in opposition to said first and second means to adjust the relationship between said first and second means, said second means including a delay means for preventing rapid fluctuations in turbine inlet pressure from causing movement of said valve and further including a bypass for said delay means automatically bypassing said delay means at turbine inlet pressures below a predetermined value.

10. In combinaton with a turbine and an alternator driven thereby, a scheduled droop control comprising a throttle for said turbine, a throttle actuator, first valve means for controlling said actuator and second means for directly controlling said throttle actuator, said second means comprising a piston urging said throttle closed in response to pressure upstream of said throttle and a second piston urging said throttle closed in response to pressure downstream of said throttle, and said first valve means comprising an automatic valve responsive to the speed and load of said alternator controlling a source of pressure acting on said throttle in opposition to said second means to control said throttle in response to changes in alternator speed and load.

11. In combination with a turbine and an alternator driven thereby, a scheduled droop control comprising a throttle for said turbine, a throttle actuator, first valve means for controlling said actuator and second means for directly controlling said throttle actuator, said second means comprising a piston urging said throttle closed in response to pressure upstream of said throttle and a second piston urging said throttle closed in response to pressure downstream of said throttle, and first valve means comprising an automatic valve responsive to the speed and load of said alternator controlling a source of pressure acting on said throttle in opposition to said second means to control said throttle in response to changes in alternator speed and load, said valve being urged to control said actuator to close said throttle upon an alternator speed exceeding a predetermined value and also being urged to control said throttle, although said turbine is operating below said predetermined speed, upon attainment of a predetermined load sensed by said downstream pressure.

12. In combination with a turbine and an alternator driven thereby, a scheduled droop control comprising a throttle for said turbine, a throttle actuator, a volume booster for controlling said actuator and means for controlling said volume booster, said means comprising a valve supplying a control pressure to said booster, said valve including first alternator-speed responsive means urging it to cause throttle closing upon an increase in alternator speed above a predetermined speed and second means urging it to cause throttle closing upon an increase in turbine inlet pressure, said second turbine inlet pressure responsive means including a delay means for preventing rapid fluctuations in turbine inlet pressure from causing movement of said valve and for delaying movement of said valve upon rapid increase in turbine inlet pressure.

13. In combination with a turbine and an alternator driven thereby, a scheduled droop control comprising a throttle for said turbine, a throttle actuator, a volume booster for controlling said actuator and means for controlling said volume booster, said means comprising a valve supplying a control pressure to said booster, said valve including first alternator-speed responsive means urging it to cause throttle closing upon an increase in alternator speed above a predetermined speed and second turbine inlet pressure responsive means urging it to cause throttle closing upon an increase in turbine inlet pressure, said second means including a delay means for preventing rapid fluctuations in turbine inlet pressure from causing movement of said valve and for delaying movement of said valve upon rapid increase in turbine inlet pressure, said volume booster comprising a differential motor including a first diaphragm, a second diaphragm, and a third small diaphragm, all of which are secured to a valve actuator actuating a valve controlling fluid flow from upstream of said throttle to said throttle actuator, means applying said control pressure to said first diaphragm to open said last-named valve, means applying pressure downstream of said throttle against said second diaphragm to open said last-named valve and against said third diaphragm to close said last-named valve, and a restriction in the conduit carrying the fluid pressure from downstream of said throttle to a position against said second diaphragm.

References Cited in the file of this patent

UNITED STATES PATENTS

| | | |
|---|---|---|
| 986,943 | Parsons et al. | Mar. 14, 1911 |
| 1,063,546 | Kieser | June 3, 1913 |
| 1,063,548 | Kieser | June 3, 1913 |
| 1,093,116 | Cubelic | Apr. 14, 1914 |
| 2,590,023 | Lewis et al. | Mar. 18, 1952 |
| 2,614,229 | Baker | Oct. 14, 1952 |
| 2,719,517 | Adler | Oct. 4, 1955 |